(12) United States Patent
He et al.

(10) Patent No.: US 10,626,022 B2
(45) Date of Patent: Apr. 21, 2020

(54) INTEGRATED APPARATUS FOR CHEMICAL PRECIPITATION AND RAPID FILTRATION OF WATER SAMPLES

(71) Applicant: Third Institute of Oceanography, State Oceanic Administration, Xiamen (CN)

(72) Inventors: Jianhua He, Xiamen (CN); Yiliang Li, Xiamen (CN); Dekun Huang, Xiamen (CN); Feng Lin, Xiamen (CN); Wu Men, Xiamen (CN); Wen Yu, Xiamen (CN); Fangfang Deng, Xiamen (CN); Jing Lin, Xiamen (CN); Fenfen Wang, Xiamen (CN); Jialin Ni, Xiamen (CN); Tao Yu, Xiamen (CN)

(73) Assignee: Third Institute of Oceanography, State Oceanic Administration, Xiamen (CN)

( * ) Notice: Subject to any disclaimer, the term of this patent is extended or adjusted under 35 U.S.C. 154(b) by 0 days.

(21) Appl. No.: 16/061,229

(22) PCT Filed: Apr. 1, 2016

(86) PCT No.: PCT/CN2016/078311
§ 371 (c)(1),
(2) Date: Jun. 11, 2018

(87) PCT Pub. No.: WO2017/096736
PCT Pub. Date: Jun. 15, 2017

(65) Prior Publication Data
US 2018/0362363 A1    Dec. 20, 2018

(30) Foreign Application Priority Data

Dec. 10, 2015  (CN) .......................... 2015 1 0916652

(51) Int. Cl.
*B01D 21/02* (2006.01)
*B01D 36/04* (2006.01)
(Continued)

(52) U.S. Cl.
CPC .............. *C02F 1/006* (2013.01); *B01D 21/02* (2013.01); *B01D 36/04* (2013.01); *C02F 1/001* (2013.01);
(Continued)

(58) Field of Classification Search
CPC ........ B01D 21/02; B01D 21/10; B01D 21/16; B01D 36/04; B01D 37/03; C02F 1/001;
(Continued)

(56) References Cited

U.S. PATENT DOCUMENTS 2,570,131 A * 10/1951 Koupal .................. B01D 29/48
                                                      210/777
3,899,414 A   8/1975 Hansen
(Continued)

FOREIGN PATENT DOCUMENTS

CN       101664664 A    3/2010
CN       202113697 U    1/2012
(Continued)

*Primary Examiner* — Lucas A Stelling
(74) *Attorney, Agent, or Firm* — The Webb Law Firm

(57) ABSTRACT

An integrated apparatus for chemical precipitation and rapid filtration of water samples. The invention relates to an apparatus for chemical precipitation and filtration of water samples. The integrated apparatus includes a reaction vessel, a lid of reaction vessel, a opening for reagent addition and gas leakage, an aerating tube, a support, a liquid phase remover, a solid phase collector, a control cover of the liquid phase remover, and a control cover of the solid phase collector.

10 Claims, 1 Drawing Sheet

(51) Int. Cl.
*B01D 37/03* (2006.01)
*C02F 1/00* (2006.01)
*C02F 1/44* (2006.01)
*C02F 1/52* (2006.01)
*C02F 1/74* (2006.01)
*C02F 7/00* (2006.01)
*C02F 103/00* (2006.01)

(52) U.S. Cl.
CPC ............... *C02F 1/008* (2013.01); *C02F 1/44* (2013.01); *C02F 1/52* (2013.01); *C02F 1/5281* (2013.01); *C02F 1/74* (2013.01); *C02F 7/00* (2013.01); *B01D 37/03* (2013.01); *C02F 2103/007* (2013.01); *C02F 2201/004* (2013.01)

(58) Field of Classification Search
CPC .. C02F 1/006; C02F 1/008; C02F 1/44; C02F 1/52; C02F 1/5281; C02F 1/74; C02F 7/00; C02F 2103/007; C02F 2201/004
See application file for complete search history.

(56) References Cited

U.S. PATENT DOCUMENTS 5,350,511 A * 9/1994 Sakurada ............... C02F 1/5281
210/199
2002/0006769 A1 1/2002 Tsuihiji et al.

FOREIGN PATENT DOCUMENTS

| CN | 102974166 A | 3/2013 |
|---|---|---|
| CN | 203389428 U | 1/2014 |
| CN | 104667627 A | 6/2015 |
| CN | 204656150 U | 9/2015 |
| CN | 105289105 A | 2/2016 |
| CN | 205235582 U | 5/2016 |
| JP | 2003144816 A | 5/2003 |
| JP | 2005342613 A | 12/2005 |
| WO | 9962615 | 12/1999 |

* cited by examiner

INTEGRATED APPARATUS FOR CHEMICAL PRECIPITATION AND RAPID FILTRATION OF WATER SAMPLES

CROSS-REFERENCE TO RELATED APPLICATIONS

This application is the United States national phase of International Application No. PCT/CN2016/078311 filed Apr. 1, 2016, and claims priority to Chinese Patent Application No. 201510916652.4 filed Dec. 10, 2015, the disclosures of which are hereby incorporated in their entirety by reference.

FIELD OF THE INVENTION

The invention relates to an apparatus for chemical precipitation and filtration of water samples, especially relates to an integrated apparatus for chemical precipitation and rapid filtration of water samples.

DESCRIPTION OF THE PRIOR ART

Chemical precipitation is a commonly used pretreatment method in marine environment monitoring, especially when the contents of target elements (or nuclides) are very low, there is a need to concentrate and enrich the target elements (or nuclides) in large volume water samples, which is from a few liters to several dozen liters, even hundreds of liters. As a result, solid-liquid separation must be performed after the chemical precipitation.

In practical operation of marine environment monitoring at present, as lacking effective method for rapid solid-liquid separation of large volume water samples, the commonly used solid-liquid separation method is that firstly, the solution treated after chemical precipitation is standing for some time (generally some days), after the precipitation is settled, the supernatant is removed by siphon, then the remaining solution is transferred into a smaller vessel for filtering. There are two main disadvantages of the method: (1) when the quantity of the sample is too large for in field operation, it must be treated after taking back to land-based laboratory, which leads low timeliness and a tremendous waste of resource; (2) the process is too long, which increases the uncertainty.

In addition, under the condition of ineffectiveness of the first siphon process, the solution should go through the standing processing for a second time, which further increases the difficulty of the whole processing.

Similarly, some developed countries (such as Germany, Greece, the United Kingdom, Russia, etc.) use methods such as ion exchange method to enrich the elements (or nuclides) of water in field, but these methods share the same disadvantages of long processing, which are not suitable for rapid pretreatment in field.

Therefore, with the rapid promoting of the marine country strategy, it is of great importance in studying the method and technology of chemical precipitation and rapid solid-liquid separation of water samples which has become an urgent demand in domestic environment monitoring.

SUMMARY OF THE INVENTION

In view of the problems of low timeliness and difficulty in operation in the current related methods used domestically and overseas, it is an object of the invention to provide an integrated apparatus for chemical precipitation reaction and rapid filtration of water samples, which realizes chemical precipitation reaction and rapid filtration of the environment water in field, and will greatly decrease the difficulty of operation in field and effectively improve the operating timeliness in field.

The integrated apparatus for chemical precipitation and rapid filtration of water samples of the invention includes a reaction vessel, a lid of reaction vessel, a opening for reagent addition and gas leakage, an aerating tube, a support, a liquid phase remover, a solid phase collector, a control cover of the liquid phase remover, a control cover of the solid phase collector.

The reaction vessel is used for containing liquid, the lid of reaction vessel is used for sealing the reaction vessel and preventing overflow of reaction solution; the opening for reagent addition and gas leakage is provided in the lid of the reaction vessel, the opening for reagent addition and gas leakage is used for adding reagents and for communicating with external air during chemical reaction; the aerating tube is used for blowing external air to ensure an uniform mixing of the solution during precipitation and for blowing external air to sweep away the solid particles on the surface of the liquid phase remover during filtrating; the support is used for supporting the reaction vessel.

The control cover of the liquid phase remover is used for opening and closing the upper part of the liquid phase remover during the solid-liquid separation to make the reaction solution in communication with the liquid phase remover and facilitate the removal of the liquid phase.

The control cover of the solid phase collector is used for opening and closing the upper part of solid phase collector to make the reaction solution in communication with the solid phase collector and facilitate the collection of the solid phase particles.

A filter membrane having pore diameters smaller than diameters of solid phase particles is positioned on top of the liquid phase remover, and upper part of the liquid phase remover is connected to the reaction vessel hermetically; the liquid phase remover is used for fast removal of the liquid phase during the solid-liquid separation, and preventing the adhesion of solid phase on its surface to improve the removal speed of liquid phase.

A filter membrane having pore diameters smaller than diameters of solid phase particles is positioned on the bottom of the solid phase collector, and upper part of the solid phase collector is connected to the reaction vessel hermetically; the solid phase collector is used for collection of the solid phase particles during the solid-liquid separation.

The reaction vessel can be made of stainless steel, Teflon or plexiglass, etc. materials, the volume of the reaction vessel can be 10~100 L.

The lid of reaction vessel can be made of stainless steel, Teflon or plexiglass, etc. materials, the size of lid of reaction vessel matches with the upper opening of the reaction vessel.

The position and size of the opening for reagent addition and gas leakage can be determined based on actual requirement.

The aerating tube can be made of plexiglass tube or plastic hose, etc. materials.

The support can be made of stainless steel, or other anti-corrosion and high-strength materials.

The material of the control cover of the liquid phase remover can be the same as that of the reaction vessel, and the opening and closing way of the control cover of the liquid phase remover can be manual, semi-automatic, or automatic.

The material of the control cover of the solid phase collector can be the same as that of the reaction vessel, and the opening and closing way of the control cover of solid phase collector can be manual, semi-automatic, or automatic.

The liquid phase remover can be made of stainless steel, Teflon or plexiglass etc materials.

The solid phase collector can be made of stainless steel, Teflon or plexiglass etc materials.

Compared to the prior art, the prominent advantages of the invention are:

(1) The invention realizes chemical precipitation reaction and rapid filtration of the environment water in field, and realizes immediate processing in field.

(2) The invention can be used on shipborne platforms, also can be used on laboratory platforms.

(3) The invention greatly decreases the difficulty of operation in field and effectively improves the operating timeliness in field.

DETAILED DESCRIPTION OF THE PREFERRED EMBODIMENTS

The present invention will be further illustrated over the following examples in combination with the figures so as to provide basis for better understanding the present invention.

Figure 1:
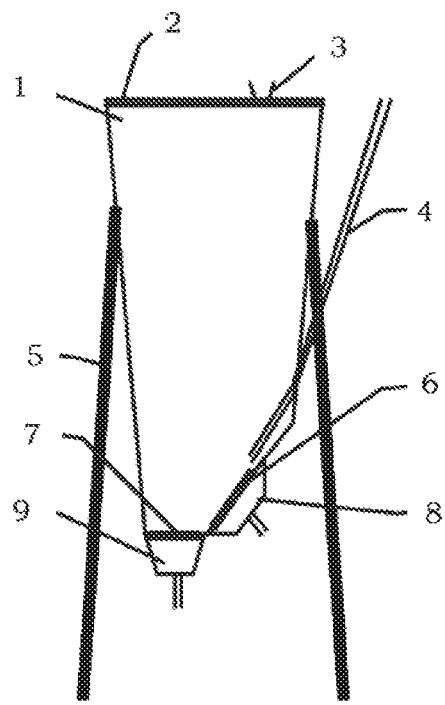
FIG. 1 is a schematic illustration showing structure composition of an embodiment of the present invention.
Figure 2:
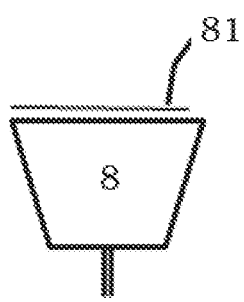
FIG. 2 is an installation schematic illustration of the filter membrane about the liquid phase remover of an embodiment of the present invention.
Figure 3:
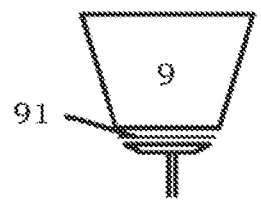
FIG. 3 is an installation schematic illustration of the filter membrane about the solid phase collector of an embodiment of the present invention.

As shown in FIGS. 1-3, the embodiment of the invention includes a reaction vessel 1, a lid of the reaction vessel 2, an opening for reagent addition and gas leakage 3, an aerating tube 4, a support 5, a liquid phase receptacle or remover 8, a solid phase receptacle or collector 9, a control cover of the liquid phase remover 6, a control cover of the solid phase collector 7.

The reaction vessel 1 is used for containing liquid, the lid of reaction vessel 2 is used for sealing the reaction vessel 1 and preventing overflow of reaction solution; the opening for reagent addition and gas leakage 3 is provided in the lid of the reaction vessel 2, the opening for reagent addition and gas leakage 3 is used for adding reagents and for communicating with external air during chemical reaction; the aerating tube 4 is used for blowing external air to ensure an uniform mixing of the solution during precipitation and for blowing external air to sweep away the solid particles on the surface of the liquid phase remover during filtrating; the support 5 is used for supporting the reaction vessel 1.

The control cover of the liquid phase remover 6 is used for opening and closing the upper part of the liquid phase remover during the solid-liquid separation to make the reaction solution in communication with the liquid phase remover and facilitate the removal of the liquid phase.

The control cover of the solid phase collector 7 is used for opening and closing the upper part of the solid phase collector to make the reaction solution in communication with the solid phase collector and facilitate the collection of the solid phase particles.

A filter membrane 81 having pore diameters smaller than diameters of solid phase particles is positioned on top of the liquid phase remover 8, and upper part of the liquid phase remover 8 is connected to the reaction vessel 1 hermetically; the liquid phase remover 8 is used for fast removal of the liquid phase during the solid-liquid separation and preventing the adhesion of solid phase on its surface to improve the removal speed of liquid phase.

A filter membrane 91 having pore diameters smaller than diameters of solid phase particles is positioned on the bottom of the solid phase collector 9, and upper part of the solid phase collector 9 is connected to the reaction vessel 1 hermetically; the solid phase collector 9 is used for collection of the solid phase particles during the solid-liquid separation.

The reaction vessel 1 can be made of stainless steel, Teflon or plexiglass, etc. materials, and the volume of the reaction vessel 1 can be 10~100 L.

The lid of reaction vessel 2 can be made of stainless steel, Teflon or plexiglass, etc. materials, and the size of the lid of the reaction vessel 2 matches with the upper opening of the reaction vessel.

The position and size of the opening for reagent addition and gas leakage 3 can be determined based on actual requirement.

The aerating tube 4 can be made of plexiglass tube or plastic hose, etc. materials.

The support 5 can be made of stainless steel, or other anti-corrosion and high-strength materials.

The material of the control cover of the liquid phase remover 6 can be the same as that of the reaction vessel, and the opening and closing way of the control cover of the liquid phase remover 6 can be manual, semi-automatic, or automatic.

The material of the control cover of the solid phase collector 7 can be the same as that of the reaction vessel, and the opening and closing way of the control cover of the solid phase collector 7 can be manual, semi-automatic, or automatic.

The liquid phase remover 8 can be made of stainless steel, Teflon or plexiglass, etc materials.

The solid phase collector 9 can be made of stainless steel, Teflon or plexiglass, etc. materials.

After the water sample is injected into the reaction vessel, start the aerating function first, then add the chemical reagent according to the related specifications, sediment forms after sufficient reaction, further connect the liquid phase remover used to remove the liquid phase of reaction solution and the solid phase collector used to collect the solid phase of reaction solution to the reaction vessel, and collect the precipitation to be processed.

The invention could be used on ship for field operation, also can be use in terrestrial laboratory for experiments.

The invention can design different shapes and sizes according to different requirements to fulfill different intended use.

The working process of the embodiment of the invention is provided as below:

After the water sample is injected into the reaction vessel, start the aerating function first, then add the chemical reagent according to the related standards/specifications, sediment forms after sufficient reaction, stop the aerating function, and install corresponding filter membranes to the liquid phase remover (FIG. 2) and the solid phase collector (FIG. 3), then connect the liquid phase remover and the solid phase collector to the reaction vessel hermetically, open the control cover of the liquid phase remover and the control cover of the solid phase collector, restart the aerating function to prevent the adhesion of solid phase on the surface of filter membrane of liquid phase remover; make sure that the main part of liquid phase flows from the liquid phase remover. With the removal of the liquid phase, the solid phase particles are transferred into the solid phase collector (the removal of residue on the inner wall of reaction vessel should be paid attention during the process); when the surface of solution in the reaction vessel is lower than the upper edge of the solid phase collector, stop the aerating function, take the solid phase collector down in proper time, and collect and dispose the precipitation on the filter membrane for a next process. The removal liquid phase is discarded according to related requirements or waits for a next process.

The invention also can be used to filter the impurity particles in water samples, no reagent is added during the implement, and other steps are the same as the above process of filtration.

The invention claimed is:

1. An integrated apparatus for chemical precipitation and rapid filtration of water samples, comprising a reaction vessel, a lid of the reaction vessel, an opening for reagent addition and gas leakage, an aerating tube, a support, a liquid phase receptacle, a solid phase receptacle, a control cover of the liquid phase receptacle, a control cover of the solid phase receptacle;

wherein the reaction vessel is used for containing liquid, the lid of the reaction vessel is used for sealing the reaction vessel and preventing overflow of reaction solution; the opening for reagent addition and gas leakage is provided in the lid of the reaction vessel, the opening for reagent addition and gas leakage is used for adding reagents and for communicating with external air during chemical reaction; the support is used for supporting the reaction vessel;

the control cover of the liquid phase receptacle is used for opening and closing upper part of the liquid phase receptacle during solid-liquid separation to make reaction solution in communication with the liquid phase receptacle and facilitate removal of the liquid phase;

the control cover of the solid phase receptacle is used for opening and closing an upper part of the solid phase receptacle to make the reaction solution in communication with the solid phase receptacle and facilitate the collection of the solid phase particles;

a filter membrane having pore diameters smaller than diameters of the solid phase particles is positioned on top of the liquid phase receptacle, and the upper part of the liquid phase receptacle is connected to the reaction vessel hermetically; the liquid phase receptacle is used for fast removal of the liquid phase during the solid-liquid separation to improve a removal speed of the liquid phase;

the aerating tube is used for blowing external air to ensure an uniform mixing of the solution during precipitation and for blowing external air to sweep away solid particles on a surface of the filter membrane during the solid-liquid separation;

a filter membrane having pore diameters smaller than diameters of the solid phase particles is positioned on bottom of the solid phase receptacle, and the upper part of the solid phase receptacle is connected to the reaction vessel hermetically; the solid phase receptacle is used for collection of the solid phase particles during the solid-liquid separation.

2. The integrated apparatus for chemical precipitation and rapid filtration of water samples according to claim 1, wherein the reaction vessel is made of stainless steel, Fluoropolymer or plexiglass.

3. The integrated apparatus for chemical precipitation and rapid filtration of water samples according to claim 1, wherein the volume of the reaction vessel is 10~100 L.

4. The integrated apparatus for chemical precipitation and rapid filtration of water samples according to claim 1, wherein the lid of the reaction vessel is made of stainless steel, Fluoropolymer or plexiglass, and the size of the lid of the reaction vessel matches the upper opening of the reaction vessel.

5. The integrated apparatus for chemical precipitation and rapid filtration of water samples according to claim 1, wherein the aerating tube is a plexiglass tube or plastic hose.

6. The integrated apparatus for chemical precipitation and rapid filtration of water samples according to claim 1, wherein the support is a stainless steel support.

7. The integrated apparatus for chemical precipitation and rapid filtration of water samples according to claim 1, wherein the material of the control cover of the liquid phase receptacle is the same as that of the reaction vessel, and opening and closing of the control cover of the liquid phase receptacle can be manual, semi-automatic, or automatic.

8. The integrated apparatus for chemical precipitation and rapid filtration of water samples according to claim 1, wherein the material of the control cover of the solid phase receptacle is the same as that of the reaction vessel, and opening and closing of the control cover of the solid phase receptacle can be manual, semi-automatic, or automatic.

9. The integrated apparatus for chemical precipitation and rapid filtration of water samples according to claim 1, wherein the liquid phase receptacle is made of stainless steel, Flouropolymer or plexiglass.

10. The integrated apparatus for chemical precipitation and rapid filtration of water samples according to claim 1, wherein the solid phase receptacle is made of stainless steel, Flouropolymer or plexiglass.

* * * * *